Patented Oct. 25, 1938

2,134,380

UNITED STATES PATENT OFFICE 2,134,380

METHOD OF MAKING CONDIMENTATION PRODUCTS

William J. Stange, Chicago, Ill., assignor to Wm. J. Stange Co., Chicago, Ill., a corporation of Illinois No Drawing. Application January 11, 1937, Serial No. 120,040

1 Claim. (Cl. 99—140)

This invention relates to a method of making a condimentation product and more particularly to a method of preparing a dry seasoning material containing extracted oleoresins and essential oils of spices mixed with a soluble and edible carrier, such as salt, sugar, and particularly corn sugar.

In the manufacture of condimentation products it has heretofore been proposed to incorporate oleoresins and the distilled essences of spices with a sugar as a carrier or vehicle. In the case of extracted oleoresins and essential oils, it is, however, rather difficult to handle these substances and to incorporate these substances evenly and thoroughly into sugar or salt carriers, owing to the fact that they vary from relatively hard solids to pasty and semi-fluid masses, depending upon the source of the oleoresins.

In accordance with my present invention, I have found that the handling of extracted oleoresins and essential oils of spices can be greatly facilitated and a more uniform product can be obtained if the extraction mass while in a concentrated but still liquid form is mixed into a substantially saturated solution of sugar or salt and the solvent and most of the water then removed by distillation, preferably under partial vacuum. By a subsequent drying step, dry seasoning material having all of the flavoring qualities of the extracted oleoresins and essential oils, is obtained.

It is therefore an important object of this invention to provide an improved method for the preparation of dry seasoning materials from extracted oleoresins and essential oils of spices.

Other and important objects of this invention will become apparent from the following description and appended claim.

The spices that may be used in the preparation of seasoning material embodying my invention are any of those commonly known, such as peppers, coriander, parsley, celery, thyme, bay leaves, marjoram, sage, dill, mace, cloves cinnamon, nutmeg and the like. The spices are first ground and then subjected to an extraction with any suitable organic solvent, such as alcohol, acetone, benzene, chlorinated hydrocarbons like ethylene dichloride, ether and the like. The extraction is preferably carried out at temperatures slightly below the boiling point of the solvent and preferably not over 140° F.

After the soluble ingredients have all been extracted from the spice and separated from the fibers and impurities of the spice by filtration or the like, the resulting solution is evaporated, or the solvent distilled off therefrom, preferably under vacuum, to a point at which a concentrated extract, comprising essential oils, oleoresins and other flavoring principles of the spices, is obtained. This concentrated extract is transferred into a vacuum evaporator provided with adequate mixing device. To this a sufficient quantity of a substantially saturated solution of refined corn sugar is then added, the quantity depending on the flavoring strength of the spice extracted, usually the weight of the corn sugar is equal to the weight of the extracted spice, figuring on the dry basis. The mixture of the corn sugar syrup and the concentrated extract of the spice is further evaporated, while agitating constantly and vigorously until all of the solvent and most of the water has been driven off, or to the point where no separation of the ingredients can thereafter take place.

The pasty mass that results from this further evaporation by distillation is then dried and ground to a pulverulent mass. A dry seasoning material is thereby obtained having a more uniform distribution of the oleoresins and essential oils than could be obtained by merely a dry mixing of the oleoresins and essential oils with a sugar. My method also greatly facilitates the handling of the extracted substances, since if all of the solvents were first removed, the handling of them would be very difficult.

Preferably, the distillation of the solvent from the extracted ingredients is carried out under a vacuum of about 27 inches of mercury, or under sufficient vacuum to permit the temperature of the mass to be kept low, say not over 115° F., during the evaporation or distillation steps.

In place of sugar, salt may be used in the preparation of the seasoning material. In that case a substantially saturated solution of salt is added instead of the saturated sugar solution. In general, the amount of salt added will be about twice the weight (on a dry basis) of the extracted oleoresins and essential oils. Mixtures of salt and sugar may also be used.

Seasoning material produced in accordance with this method not only accurately reproduces the full and true flavor of the spice, but the flavor is uniformly distributed in an edible and soluble carrier. Thus it represents an improved seasoning material.

I am aware that numerous details of the process may be varied through a wide range without departing from the principles of this invention, and I, therefore, do not purpose limiting the patent granted hereon otherwise than necessitated by the prior art.

I claim as my invention:

The process of making a dry seasoning material which comprises extracting the oleoresins and essential oils from a spice by means of an organic solvent, concentrating the resulting extract solution to remove some of the organic solvent, mixing with said concentrated extract a substantially saturated aqueous solution of an edible carrier selected from the group consisting of salts and sugars, vigorously agitating and further concentrating the mixture thus obtained under partial vacuum until all of the solvent and most of the water have been removed, drying the resulting mixture, and grinding the same.

WILLIAM J. STANGE.